Feb. 24, 1953
H. C. DAVIS
2,629,312
PRESSURE COOKER
Filed Sept. 30, 1949
2 SHEETS—SHEET 1
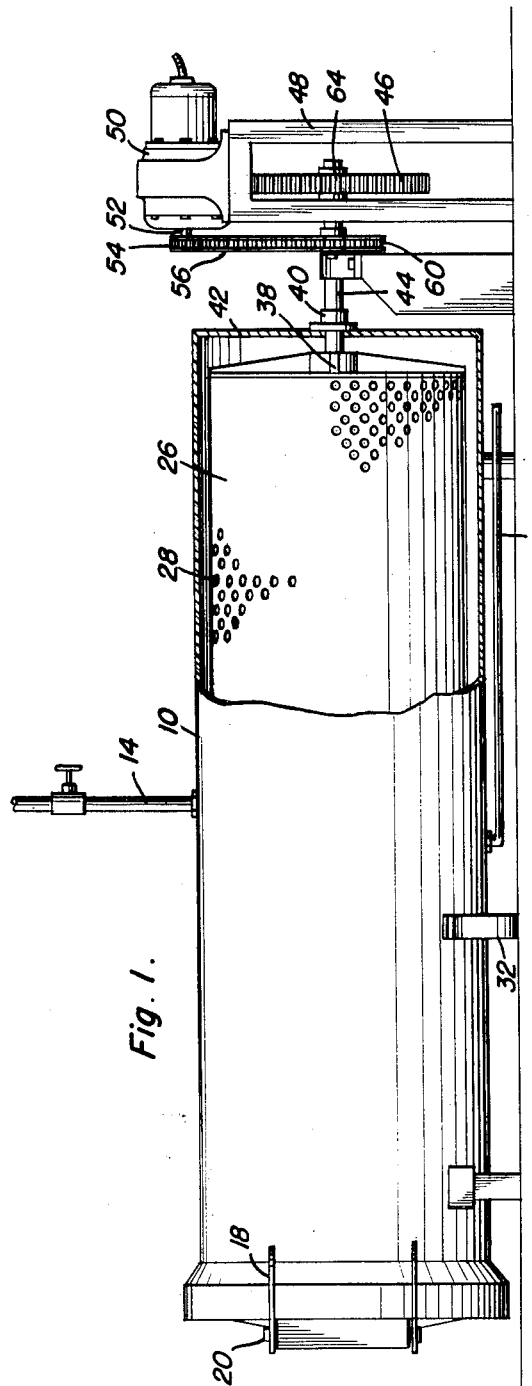
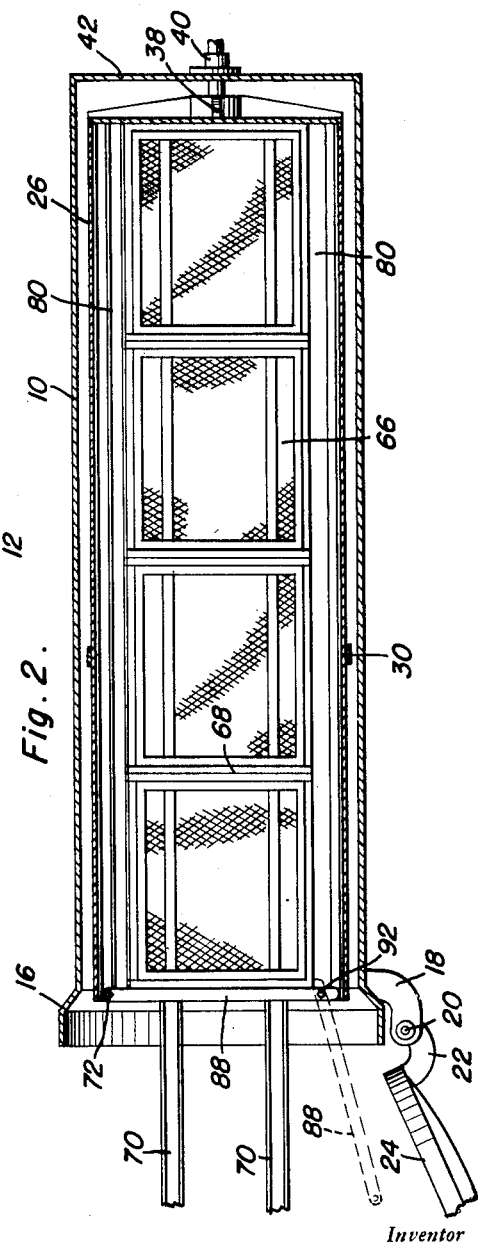
Inventor
Hamilton C. Davis
By Clarence A. O'Brien
and Harvey B. Jackson
Attorneys

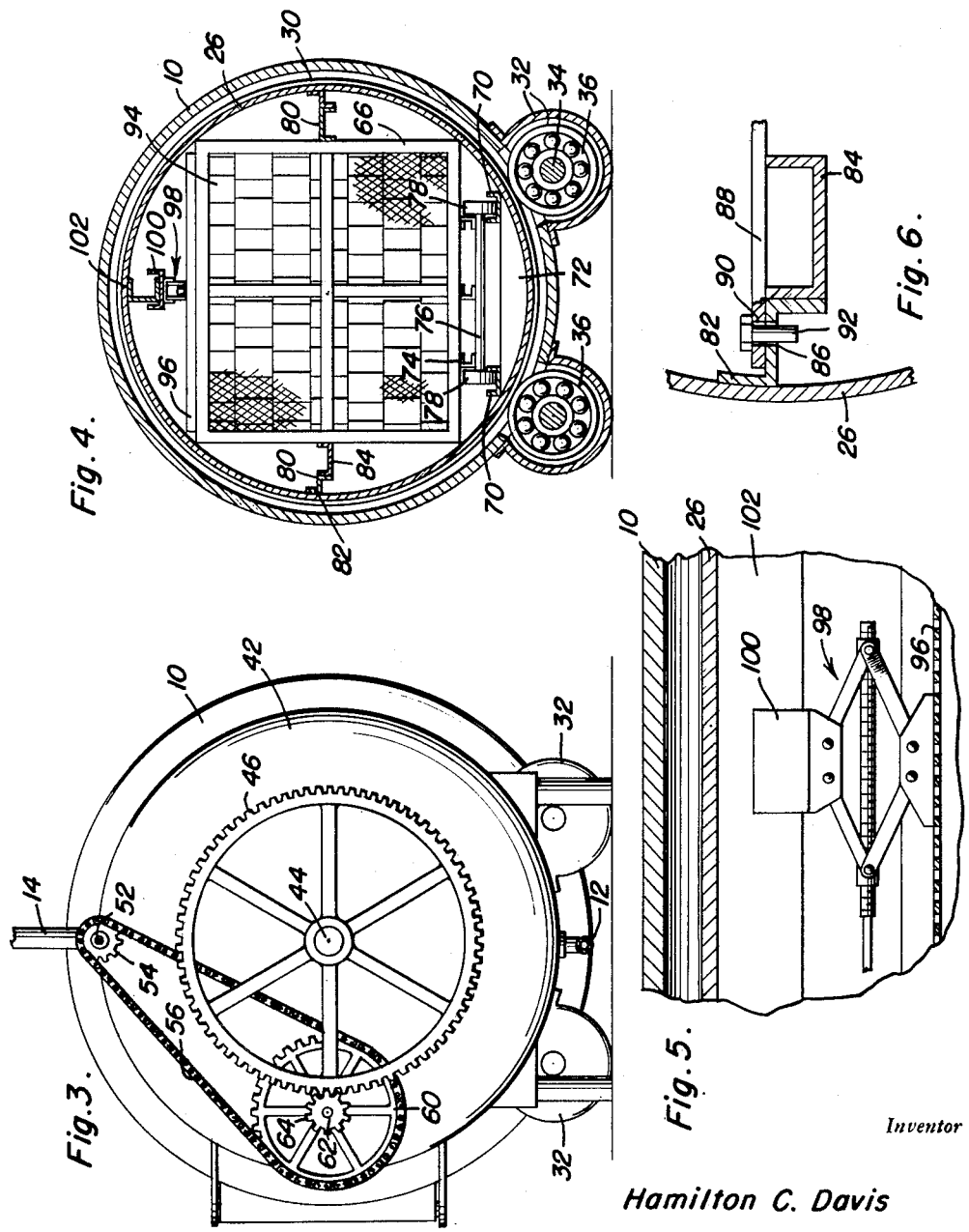

Patented Feb. 24, 1953

2,629,312

UNITED STATES PATENT OFFICE 2,629,312

PRESSURE COOKER

Hamilton C. Davis, Diablo, Calif., assignor to Walnut Creek Canning Co., Walnut Creek, Calif., a corporation of California Application September 30, 1949, Serial No. 118,850

2 Claims. (Cl. 99—371)

This invention relates to a rotary pressure cooker for cooking and/or sterilizing large quantities of food under pressure and particularly designed for use with applicant's rice canning process disclosed in his application for patent, Serial No. 52,417, filed October 1, 1948 and now abandoned on December 12, 1951.

The primary object of this invention is to provide a sturdy pressure cooker in which retort baskets containing a multitude of canned foods may be safely rotated at a slow speed within a steam jacket.

A further object of this invention is to provide a rotary pressure cooker for canned foods having a perforated inner shell rotatable within an outer shell or steam jacket, and means within the inner shell for slidably and guidingly retaining wire retort baskets therein.

Yet another object of this invention is to provide a pressure cooker of the character described in which the wire retort baskets are provided with a removable cover so that access may be had for loading the retort baskets, and a novel means for lockingly retaining the cover in place on the baskets and within the inner rotatable perforated shell to prevent lateral movement of the cover relative to the baskets and the inner shell.

These, together with various ancillary objects and features of the invention which will later become apparent as the following description proceeds, are attained by the device, a preferred embodiment of which has been illustrated, by way of example only, in the accompanying drawings, wherein:

Figure 1 is a side elevational view of the pressure cooker, parts being broken away to show details of construction;

Figure 2 is a horizontal sectional view through the pressure cooker and looking downwardly on Figure 1, the driving means being removed;

Figure 3 is an end elevational view looking to the left on Figure 1;

Figure 4 is a transverse vertical sectional view through the pressure cooker;

Figure 5 is a fragmentary longitudinal vertical sectional view through the pressure cooker illustrating the means for lockingly retaining the retort cover in place; and Figure 6 is a transverse sectional view through the inner shell and illustrating the latch bar for retaining the retort baskets in place within the inner shell.

Specific reference will now be made to the drawings. In the several views, in the accompanying drawings and in the following specification, similar reference characters indicate corresponding elements throughout.

In the canning of certain foods such as rice, it becomes necessary to cook the canned foods and sterilize the same with live steam so that a large number of cans can be so treated that the contents thereof will be subjected to mild agitation throughout the cooking period to minimize injury to the contents of the can. In the canning of rice, in particular, as set forth in my patent application, Serial No. 52,417, a multitude of cans of rice must be cooked and sterilized under pressure while the cans are rotated at a slow speed and end over end. The present pressure cooker is designed and constructed to effectively carry out this process.

The pressure cooker is fabricated either of stainless steel or of other strong and rust-resisting metals and includes an outer, substantially cylindrical shell or jacket 10 which has a conduit or pipe 12 secured to its bottom wall for the introduction of live steam and a valved conduit 14 secured to its top wall for conveying away the live steam. At one end, the outer shell or jacket 10 is open and provided with an enlarged shoulder or flange 16, at one side of which is provided an ear 18 to which is pivoted, as at 20, another ear 22 carrying a door 24 for closing this open end. Opposite the ear 18, the shoulder or flange 16 may be provided with a keeper (not shown) for engaging a latch (not shown) carried by the door 24. While the door may be hinged to the outer shell 10 by means of a single ear 18, a single pivot 20, and a single ear 22, it is preferred that a pair of ears 18 and a pair of ears 22 be employed as shown in the drawings so that the door will be securely hinged to the outer shell.

Positioned within the outer jacket 10 is an inner, substantially cylindrical shell 26 which is perforated as at 28 and which may be further provided with reinforcing bands 30. The outer shell or jacket 10 has secured to its bottom wall at desired positions, a plurality of arcuated housings 32 which open into the interior of the shell and in which are rotatably mounted, on suitable stub shafts 34, ball bearings 36 which serve as rotatable supports for the inner perforated shell 26, as will be clear with reference to Figure 4. It will further be noted that the housings 32 for the rotatable ball bearings 36 also serve as leg supports for the outer shell 10 which is preferably retained in a horizontal position.

The end of the inner perforated shell 26 adjacent the door 24 is open, while the opposite end is closed and includes a threaded aperture for receiving a screw 38 which is, in turn, received in a suitable bearing 40 carried centrally in the end wall 42 of the outer jacket 10. The screw 38 is coupled to a stub shaft 44 extending through the bearing 40, upon which is secured a relatively large, toothed gear 46. The relatively large gear 46 is positioned between the legs of a bracket 48 which supports a suitable motor 50 having a drive shaft 52 which carries a relatively small sprocket 54, coupled, by means of an endless chain 56, to a somewhat larger sprocket 60 which is rotatably supported upon a shaft 62 that is offset from the shaft 44. The sprocket 60 carries a pinion 64 which drivingly engages the teeth of the large sprocket 46. Thus, it will be seen that the motor 50 rotates the inner perforated shell 26 within the outer shell or jacket 10 at a relatively slow speed through the reduction gearing 54, 60, 62 and 46.

A substantially rectangular, wire retort basket 66 is provided which may either be a single elongated basket or a series of interconnected baskets separated by suitable partitions 68. The retort basket 66 is positioned in the inner shell 26 through the open end of the jacket 10 when the door 24 is open and is slidingly and guidingly retained within the inner shell in the following manner. A pair of elongated, preferably U-shaped tracks 70, interconnected by a series of spaced, arcuated cross-bars 72, are provided which can be slid in and out of the inner shell, as shown clearly in Figure 2. Because the cross-bars 72 are arcuated at their bottom edges to conform to the inner contour of the inner shell 26, the tracks 70 can be securely retained within the inner shell, as will be readily understood. Secured to the bottom wall of the retort basket 66 is a plurality of brackets 74 which are, in turn, secured to shafts 76 which carry rollers 78 at their ends, which rollers are slidably received on or within the tracks 70. Thus, the retort basket 66 is rolled into the inner perforated shell 26 on the tracks 70, and after the retort basket is in proper position within the shell, the tracks 70 may be pushed into the shell to be wholly confined therein.

To further retain the basket 66 within the pressure cooker so that there will be no lateral movement of the basket relative to the pressure cooker as the inner shell 26 is rotated, the inner shell 26 carries, at diametrically opposed positions, inwardly extending brackets 80 which are adapted to engage the side walls of the retort baskets 66, as will be obvious with reference to Figure 4. The brackets consist of a substantially S-shaped bar 82, to one leg of which is welded a U-shaped bar or channel bar 84. To prevent any longitudinal movement of the retort basket 66 within the pressure cooker, the forward ends of the bars 82 are provided with suitable apertures 86, see Figure 6, which are in horizontal alignment. A latch bar 88 extends transversely across the inner shell 26 and is apertured adjacent its ends, as at 90, to receive headed pivot pins 92 which are removably retained in the apertures 86 and 90. Thus, when one of the pivot pins 92 is removed, the latch bar 88 may be pivoted on the other pivot pin 90 to assume the position shown in dotted lines in Figure 2. Both pivot pins may be removed, if desired, to allow for a complete removal of the latch bar.

In order to stack the cans 94 within the retort basket 66, a removable cover 96 is provided for the retort basket. However, a means must be provided to keep the removable cover 96 in place on the retort basket and in proper position within the inner shell 26 to prevent rattling of the removable cover or any relative lateral movement of the cover. This means consists of a jack 98 which is secured to the top of the cover 96, it being understood that while a screw-type, toggle jack is shown in the drawings, any other type jack may be employed to advantage. The jack 98 carries a bearing member 100, preferably in the form of a channel iron which is adapted to engage a further channel bar 102 which is carried by the inner shell 26 and extends inwardly thereof, the engagement occuring when the jack is in an extended position, as will be readily understood.

Thus, it will be seen that a novel pressure cooker is provided which will allow a retort basket containing cans of food to be rotated at a relatively slow speed within a steam jacket and which is further provided with a means for sliding the retort basket in and out of the steam jacket and retaining the same in a desired fixed position within an inner perforated shell to prevent endwise or lateral movement of the retort basket in the pressure cooker.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A pressure cooker comprising an outer shell and conduit means for conveying steam therethrough, an inner perforated shell, leg supports carried by said outer shell including bearings for rotatably mounting said inner shell within said outer shell, retort baskets for retaining stacked cans, means for slidably and guidingly retaining said retort baskets in said inner shell, and means for rotating said inner shell within said outer shell, said retort baskets including a removable cover and means for lockingly retaining said cover in place on said retort baskets and within said inner shell, said last-named means including a screw type toggle jack secured to the top of said cover, a channel bearing member carried by said jack and a bar carried by said inner shell receiving said channel bearing member.

2. A pressure cooker comprising an outer shell, conduit means for carrying live steam into and out of said shell, an inner perforated cylindrical shell, means supporting said inner shell for rotation in said outer shell, a substantially rectangular retort basket in said inner shell, support means for said basket including a pair of spaced apart U-shaped tracks, arcuated cross-bars interconnecting said tracks, said support being slidable in and out of said inner shell, rollers on said basket engaging said tracks, inwardly extending brackets secured to said inner shell and engaging the sides of said basket, a lid on said basket, a depending channel bar carried by said inner shell, a jack secured to said cover and engaging said channel bar.

HAMILTON C. DAVIS.

REFERENCES CITED

The following references are of record in the file of this patent:

UNITED STATES PATENTS

| Number | Name | Date |
| --- | --- | --- |
| 665,021 | Lees | Jan. 1, 1901 |
| 829,212 | Hughes | Aug. 21, 1906 |
| 848,033 | Hood | Mar. 26, 1907 |
| 900,064 | Forhan | Sept. 29, 1908 |
| 1,010,805 | Rogers | Dec. 5, 1911 |
| 1,174,189 | Smith | Mar. 7, 1916 |
| 1,327,220 | Babendreer | Jan. 6, 1920 |
| 2,065,752 | Schmidt | Dec. 29, 1936 |

FOREIGN PATENTS

| Number | Country | Date |
| --- | --- | --- |
| 254,272 | Italy | July 15, 1927 |